United States Patent [19]
Crenshaw et al.

[11] Patent Number: 6,081,094
[45] Date of Patent: Jun. 27, 2000

[54] CLIP-ON POWER SOURCE FOR AN AVIATOR'S NIGHT VISION IMAGING SYSTEM

[75] Inventors: David A. Crenshaw, Roanoke; Mark R. Critzer, Salem; John T. Domalski, Roanoke, all of Va.

[73] Assignee: ITT Manufacturing Enterprises, Inc., Wilmington, Del.

[21] Appl. No.: 08/896,213

[22] Filed: Jul. 17, 1997

(Under 37 CFR 1.47)

[51] Int. Cl.[7] .................................................. H01M 10/46
[52] U.S. Cl. .......................................... 320/114; 359/409
[58] Field of Search ..................... 320/107, 112, 320/114, FOR 101; 429/96, 99, 100; 359/409, 407, 408

[56] References Cited

U.S. PATENT DOCUMENTS

| | | |
|---|---|---|
| 4,449,787 | 5/1984 | Burbo et al. . |
| 4,953,963 | 9/1990 | Miller ........................................ 359/409 |
| 5,121,045 | 6/1992 | Caserta et al. ........................... 320/114 |
| 5,535,053 | 7/1996 | Baril et al. . |
| 5,542,627 | 8/1996 | Crenshaw et al. ....................... 244/121 |
| 5,683,831 | 11/1997 | Baril et al. ................................ 429/96 |

*Primary Examiner*—Edward H. Tso
*Attorney, Agent, or Firm*—Arthur L. Plevy; Saul Elbaum

[57] ABSTRACT

A clip-on power source for powering an ANVIS binocular. The power source has an electrical interface that enables the power source to be detachably coupled to the ANVIS binocular. The interface also enables the power source to pivot relative to the binocular from a first position to a second position to power-on and power-off the ANVIS binocular.

20 Claims, 4 Drawing Sheets

CLIP-ON POWER SOURCE FOR AN AVIATOR'S NIGHT VISION IMAGING SYSTEM

FIELD OF THE INVENTION

The present invention relates generally to power sources and more specifically to a portable power source for a night vision imaging system.

BACKGROUND OF THE INVENTION

Night vision imaging systems are used to enhance vision in low-light conditions and are therefore, commonly employed in the military for use by soldiers, aviators and sailors. The central component of a night vision imaging system is an image intensifier tube which functions to multiply incident light received by the system to produce a display that is sufficiently bright for presentation to a viewer's eyes. Most of these night vision imaging systems also include lens assemblies, battery packs and adjustable mountings, and are manufactured as monocular or binocular assemblies depending upon the specific application.

The night vision imaging systems commonly used by most military aviators are designed as binocular assemblies to provide the aviator with depth perception for flights made during low-light conditions. Such systems are designed to be mounted to an aviator's helmet and are referred to as Aviator's Night Vision Imaging Systems (ANVIS). A helmet mount affixes to the front of the aviator's helmet via screws to provide a method for removably attaching an ANVIS binocular to the helmet and power the ANVIS binocular. A power source consisting of electrical contacts integrated into the helmet mount and a disconnectable battery pack which is affixed to the rear of the helmet during use via hook and loop fasteners, powers the ANVIS binocular. Battery power from batteries contained in the battery pack, is routed to the ANVIS binocular through a cable which is coupled between the contacts of the helmet mount and the battery pack. The ANVIS binocular has a fore and aft slide assembly that operates with the helmet mount to enable the ANVIS binocular to be rotated relative to the helmet, from an operational position to a non-operational position. When the ANVIS binocular is rotated to the operational position, the electrical chin the helmet mount engage electrical contacts provided on the ANVIS binocular to conduct power thereto. Examples of such night vision binocular imaging systems are described in U.S. Pat. No. 4,449,783 to Burbo et al. and U.S. Pat. No. 5,535,053 to Baril et al.

The ANVIS power source works well during its intended primary use mode of providing visual clues to aviators during low-light flight conditions. However, a major disadvantage of the system is that the helmet is required to operate the ANVIS binocular since, power for the binocular is supplied through the helmet mount which is affixed to the helmet. In order to use the ANVIS binocular without the helmet, the aviator must disassemble the helmet mount from the helmet which is difficult. The remaining helmet mount and battery pack must then be electrically connected by the cable which is approximately two feet in length. This makes the system unwieldy and does not promote efficient use of the ANVIS binocular.

Such a disadvantage can have severe consequences when an aviator is downed behind enemy lines and needs the ANVIS binocular separated from the bulky helmet, to escape and evade the enemy.

Accordingly, there is a need for a power source which allows an ANVIS binocular to be used as a hand held unit.

SUMMARY

A clip-on power source for powering a night vision device, which comprises a battery compartment sized for at least one battery which powers the night vision device and electrical interface means affixed to the battery compartment. The interface means detachably couples the power source to the night vision device and allows the power source to pivot relative to the night vision device from a first position to a second position to thereby enable a battery installed in the battery compartment to electrically connect to and electrically disconnect from the night vision device as the power source pivots from the first position to the second position.

BRIEF DESCRIPTION OF THE DRAWINGS

For a detailed understanding of the present invention, reference should be made to the following detailed description taken in conjunction with the accompanying drawings wherein.

DETAILED DESCRIPTION OF THE INVENTION

The power source of the present invention is a portable clip-on unit that is especially suited for powering an ANVIS binocular without the helmet mount and the helmet mounted battery pack. Accordingly the power source of the present invention will be described in conjunction with its application to an ANVIS binocular. It should be understood, however, that the portable clip-on power source of the present invention can also be adapted for use in virtually any application where a portable power source would be desirable.

The clip-on power source of the present invention allows the ANVIS user to utilize the ANVIS binocular in the hand held mode when the helmet and helmet mount are not available or desirable for use. The clip-on power source of the present invention is a light weight unit that weighs only approximately 45 grams without batteries. Its compact dimensions result in a low profile that allows the power source to be easily carried in a user's survival vest. As will be explained further on, the power source is constructed to operate as its own on/off switch which makes its use with arctic mittens simple.

Figure 1:
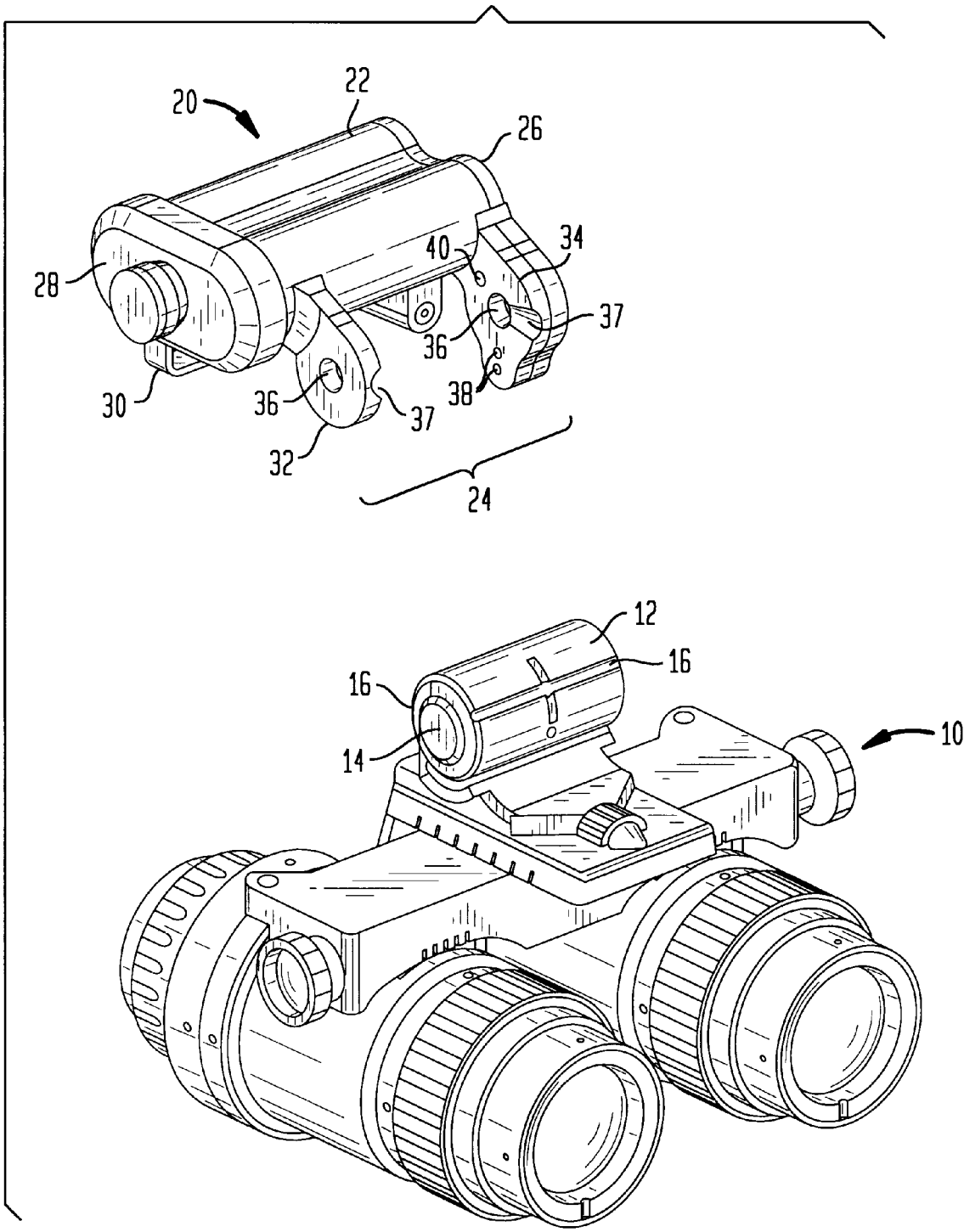
FIG. 1 is an exploded perspective view showing an embodiment of the clip-on power source of the present invention and an ANVIS binocular.

Referring to FIG. 1, an exemplary embodiment of the clip-on power source 20 of the present invention is shown and designated by numeral 20. The power source 20 generally comprises two main components: a battery compartment 22 and an electrical interface 24. The battery compartment 22 conforms to the shape of the batteries to minimize the overall size of the power source 20. The electrical interface 24 is made up of two ear-shaped members 32, 34 that extend from one side of the battery compartment 22 and enable the power source 20 to be detachably coupled or "clipped-on" to a standard binocular fore and aft slide assembly 12 of an ANVIS binocular 10 to provide power thereto.

Referring to FIGS. 2A–2D, the battery compartment 22 includes a base 26 and a removable snap-on battery compartment access door or closure 28, all of which are preferably molded from plastic or any other suitable material. The battery compartment 22 is sized to receive two standard alkaline AA batteries 52 which provide 38 hours of operation over an operational temperature range of −20° C. to +52° C. and weigh 45 grams. Alternatively, the battery compartment 22 can accept two L9 lithium AA batteries for lighter weight and increased endurance since, such batteries provide 48 hours of operation over an operational temperature range of −40° C. to +52° C. and weigh 30 grams. To further minimize the size of the battery compartment 22, the batteries 52 are oriented in a side by side arrangement.

Figure 2A:
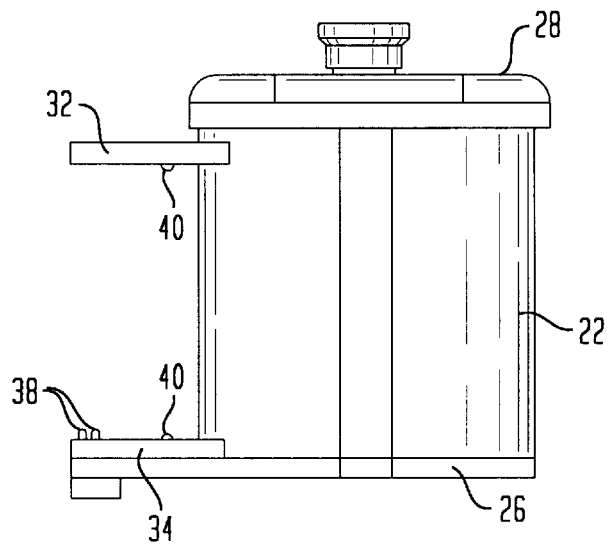
FIG. 2A is an elevational view of the clip-on power source of FIG. 1.
Figure 2B:
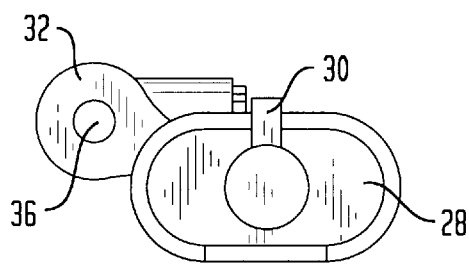
FIG. 2B is a top plan view of the clip-on power source of FIG. 2A.
Figure 2C:
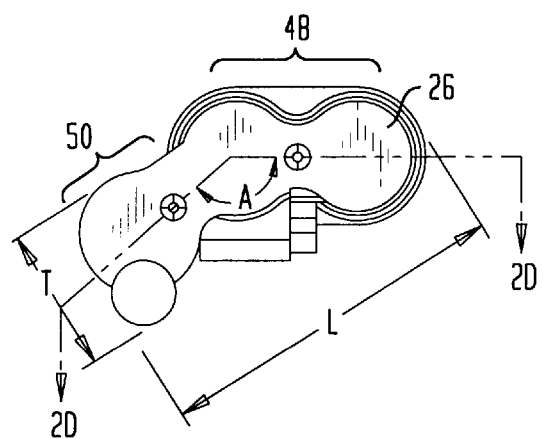
FIG. 2C is a bottom plan view of the clip-on power source of FIG. 2B.
Figure 2D:
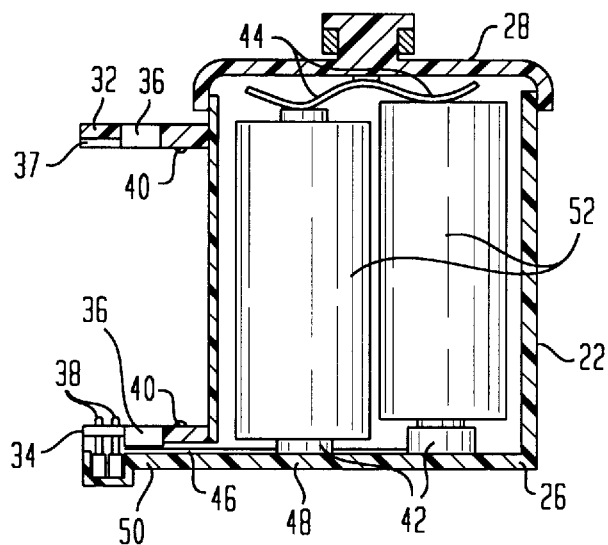
FIG. 2D is a cross-sectional view through line 2D—2D of the clip-on power source of FIG. 2C.

As best seen in FIG. 2C, the base 26 of the battery compartment 22 has a first section 48 that conforms to the shape of the battery compartment 22 to close off one end thereof and a second section 50 that conforms to the ear-shaped member 34 of the electrical interface 24 located immediately adjacent thereto. As shown in FIG. 2D, the first section 48 of the base 26 includes a first set of battery contacts 42. The second section 50 of the base 26 channels a pair of leads 46 that electrically connect a pair of spring-biased power contacts 38 which extend from the surface of the ear-shaped member 34 of the electrical interface 24 to the first set of battery contacts 42 disposed on the inner surface of the first section 48 of the base 26. The removable snap-on battery compartment access door 28 includes a second set of battery contacts 44 which are disposed on an inner surface thereof. The battery compartment access door 28 also includes an elastically resilient strap 30 that tethers the access door 28 to the battery compartment 22. The first and second sets of battery contacts 42, 44 are conventionally arranged to electrically couple the two AA batteries 52 in series with each other.

Referring again to FIG. 1, the two ear-shaped members 32, 34 of the electrical interface 24 extend laterally away from the battery compartment 22 at an angle of approximately 35° (FIG. 2C). This arrangement allows the power source 20 to have a thickness T of approximately 1 inch and a length L of approximately 2¼ inches. Thus, the clip-on power source 20 of the present invention can be easily stored or incorporated into a survival vest. Each ear-shaped member 32, 34 has an aperture 36 and a lead-in groove 37 for receiving one of two spring loaded ball plungers 14 (only one is visible) of the fore and aft slide assembly 12 of the ANVIS binocular 10. The lead-in grooves 37 allow the ear-shaped members 32, 34 of the electrical interface 24 to slide on over the spring loaded ball plungers 14 of the fore and aft slide assembly 12 of the ANVIS binocular 10 when mounting the power source 20 thereto. The power source 20 is retained in position on the ANVIS binocular 10 by the force of the spring loaded ball plungers 14, when they spring into the apertures 36 in the ear-shaped members 32, 34 of the electrical interface 24. Power is provided via the two spring loaded contacts 38 in the ear-shaped member 34 which mate with contact pads (not shown) on the fore and aft slide assembly 12 when the power source 20 is rotated into one of two positions as will be explained immediately below.

Figure 3A:
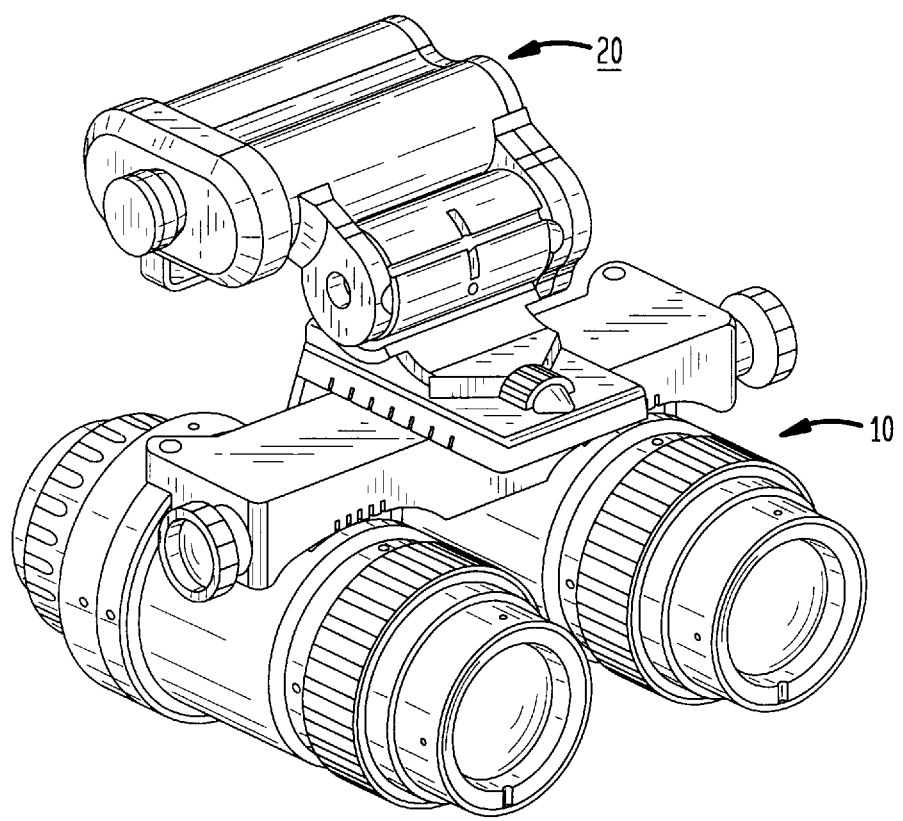
FIG. 3A is a perspective view of the clip-on power source coupled to the ANVIS binocular and rotated to the power-on position.
Figure 3B:
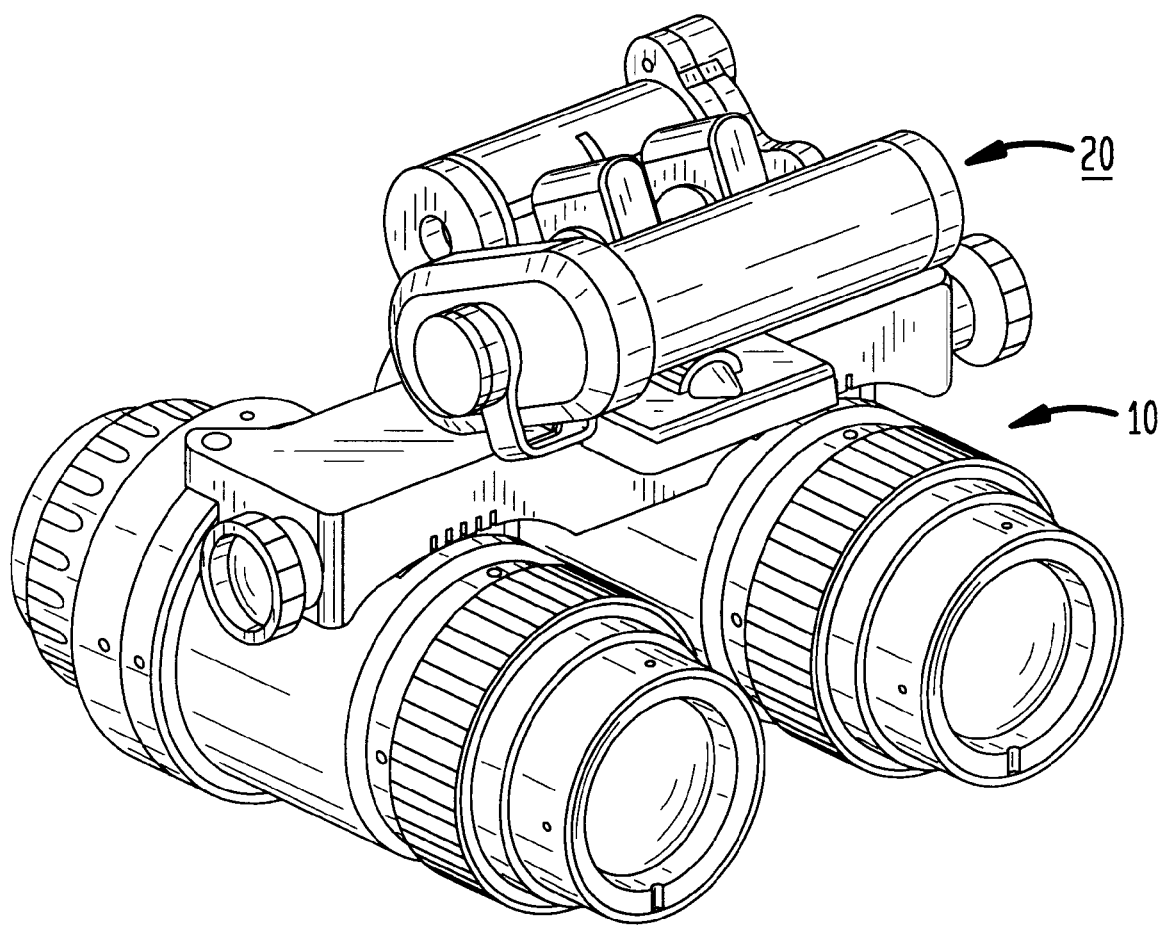
FIG. 3B is a perspective view of the clip-on power source coupled to the ANVIS binocular and rotated to the power-off position.

As illustrated in FIGS. 3A and 3B, and mentioned earlier, the clip-on power source 20 operates as its own on/off switch. This is accomplished by rotating the power source 20 relative to the ANVIS binocular 10 about the ball plungers 14 of the fore and aft slide assembly 12, which is analogous to the familiar in-use and stowed positions of the binocular mount. In FIG. 3A, the power source 20 is shown rotated rearward with respect to the ANVIS binocular 10 into the power-on position which aligns the spring-loaded contacts 38 with the contact pads (not visible) on the fore and aft slide assembly 12. In this position, battery power is routed from the batteries 52 of the power source 20 to the ANVIS binocular 10 via the electrical connection provided by the mated spring-loaded contacts 38 and the contact pads on the fore and aft slide assembly 12.

In FIG. 3B, the power source 20 is shown rotated forward with respect to the ANVIS binocular 10 into the power-off position where the spring-loaded contacts 38 are not aligned with the contact pads on the fore and aft slide assembly 12. In this position, battery power is not routed from the batteries 52 of the power source 20 to the ANVIS binocular 10 because no electrical connection is made between the spring-loaded contacts 38 and the contact pads on the fore and aft slide assembly 12.

Referring again to FIGS. 2A and 2B, the clip-on power source 20 is held in the power-on or power-off positions by two small ball plungers 40 provided on the ear-shaped members 32, 34 of the electrical interface 24, which detent into slots 16 (see FIG. 1) on the fore and aft slide assembly 12 of the ANVIS binocular 10.

As should be readily apparent, the clip-on power source of the present invention provides added security since, it provides the ANVIS binocular user with night vision capability while on the ground which benefits a soldier downed behind enemy lines. Should the user have the opportunity to take the ANVIS when grounded, the clip-on power source of the present invention will allow the bulky helmet to be discarded without forfeiting the use of the ANVIS binocular, thereby greatly enhancing the user's ability to escape and evade.

It should be understood that the embodiment described herein is merely exemplary and that a person skilled in the art may make many variations and modifications to the embodiment utilizing functionally equivalent elements to those described herein. Any and all such variations or modifications as well as others which may become apparent to those skilled in the art, are intended to be included within the scope of the invention as defined by the appended claims.

What is claimed is:

1. A clip-on pivotable power source for powering a night vision device having pivot mounting members, said power source comprising:

a battery compartment sized for at least one battery which powers the night vision device and electrical interface means affixed to said battery compartment, for detachably coupling said power source to the night vision device via said pivot mounting members, and allowing said power source to pivot relative to the night vision device from a first position to a second position, thereby enabling a battery installed in said battery compartment to electrically connect to and electrically disconnect from said night vision device as said power source pivots from said first position to said second position.

2. The power source according to claim 1, wherein said battery compartment is sized to hold two batteries.

3. The power source according to claim 2, wherein said battery compartment includes means for series coupling two batteries contained therein.

4. The power source according to claim 1, wherein said battery compartment is sized to hold two AA batteries.

5. The power source according to claim 1, wherein said battery compartment is accessible through a removable closure.

6. The power source according to claim 1, wherein said electrical interface means includes a pair of spaced apart members, each of said members including an aperture for receiving corresponding pivot mounting members defined on the night vision device, said spaced apart members cooperating with the pivot mounting members of the night vision device to enable said power source to pivot relative to the night vision device from said first position to a second position.

7. The power source according to claim 6, wherein one of said spaced apart members includes electrical contact means for engaging electrical contact means defined on the night vision device when said power source is pivoted into the first position.

8. The power source according to claim 6, wherein one of said spaced apart members includes locking means for locking said power source in either said first or second position.

9. The power source according to claim 1, wherein said electrical interface means includes electrical contact means for engaging electrical contact means defined on the night vision device when said power source is pivoted into the first position.

10. The power source according to claim 1, wherein said electrical interface means includes locking means for locking said power source in either said first or second position.

11. The power source according to claim 1, wherein the night vision device comprises an aviator's night vision imaging system (ANVIS) binocular.

12. A hand-held night vision device comprising:
   an aviator's night vision imaging system (ANVIS) binocular having pivot mounting members;
   a clip-on pivotable power source for powering said binocular, said power source including a battery compartment sized for two double AA batteries which power said binocular; and
   electrical interface means affixed to said battery compartment, for detachably coupling said power source to said binocular via said pivot mounting members and allowing said power source to pivot relative to said binocular from a first position to a second position, thereby enabling batteries installed in said battery compartment, to electrically connect to and electrically disconnect from said binocular when said power source pivots from said first position to said second position.

13. The device according to claim 1, wherein said battery compartment is accessible through a removable closure.

14. The device according to claim 1, wherein said electrical interface means includes a pair of spaced apart members, each of said members including an aperture for receiving corresponding pivot mounting members defined on said binocular, said spaced apart members cooperating with the pivot mounting members to enable said power source to pivot relative to said binocular from said first position to a second position.

15. The device according to claim 14, wherein one of said spaced apart members includes electrical contact means for engaging electrical contact means defined on said binocular when said power source is pivoted into the first position.

16. The device according to claim 14, wherein one of said spaced apart members includes locking means for locking said power source in either said first or second position.

17. The device according to claim 12, wherein said electrical interface means includes electrical contact means for engaging electrical contact means defined on said binocular when said power source is pivoted into the first position.

18. The device according to claim 12, wherein said electrical interface means includes locking means for locking said power source in either said first or second position.

19. A clip-on pivotable power source for powering a night vision device having pivot mounting members, said power source comprising:
   a battery compartment sized for at least one battery which powers the night vision device;
   an electrical interface affixed to said battery compartment, said interface including coupling means for detachably coupling said power source to the pivot mounting members of said night vision device thereby enabling said power source to pivot relative to the night vision device from a first position to a second position; and
   electrical contact means associated with said coupling means for enabling a battery installed in said battery compartment, to electrically connect to and electrically disconnect from said night vision device when said power source pivots from said first position to said second position.

20. The power source according to claim 1, wherein said coupling means includes a pair of spaced apart members, each of said members including an aperture for receiving corresponding pivot mounting members defined on the night vision device, said spaced apart members cooperating with the pivot mounting members of the night vision device to enable said power source to pivot relative to the night vision device from said first position to a second position, one of said spaced apart members including said electrical contact means which engage electrical contact means defined on the night vision device when said power source is pivoted into the first position.

* * * * *